United States Patent [19]

Kaneko

[11] Patent Number: 4,702,431
[45] Date of Patent: Oct. 27, 1987

[54] DRAG FORCE MEASURING DEVICE FOR SPINNING REELS

[75] Inventor: Kyoichi Kaneko, Tokyo, Japan

[73] Assignee: Daiwa Seiko, Inc., Tokyo, Japan

[21] Appl. No.: 901,807

[22] Filed: Aug. 28, 1986

[30] Foreign Application Priority Data

| Aug. 30, 1985 | [JP] | Japan | 60-191777 |
| Nov. 25, 1985 | [JP] | Japan | 60-264121 |
| Jul. 25, 1986 | [JP] | Japan | 61-174909 |
| Jul. 30, 1986 | [JP] | Japan | 61-179034 |

[51] Int. Cl.$^4$ .......................... H01K 89/01; G01L 3/14
[52] U.S. Cl. ............................... 242/84.5 A; 73/862.32; 242/84.21 R
[58] Field of Search ............... 242/84.1 M, 84.2 R, 242/84.21 R, 84.5 R, 84.5 A, 84.5 P, 84.51 R, 84.51 A; 73/121, 130, 862.19, 862.32, 862.44

[56] References Cited

U.S. PATENT DOCUMENTS

| 2,173,039 | 9/1939 | Muir | 73/862.32 |
| 2,607,219 | 8/1952 | Millard et al. | 73/862.32 X |
| 3,016,741 | 1/1962 | Kulp | 73/862.54 |
| 3,246,859 | 4/1966 | Martin | 242/217 X |
| 3,255,981 | 6/1966 | Wood | 242/84.5 A |
| 3,364,734 | 1/1968 | Wilson | 73/862.32 X |
| 4,083,233 | 4/1978 | Seal | 73/862.39 X |
| 4,124,174 | 11/1978 | Kelly | 242/84.1 M X |
| 4,317,377 | 3/1982 | Wrinkle | 73/862.42 |
| 4,555,072 | 11/1985 | Hitomi | 242/84.5 P |
| 4,650,161 | 3/1987 | Kaneko | 242/84.5 A |

Primary Examiner—Stuart S. Levy
Assistant Examiner—Joseph J. Hail, III
Attorney, Agent, or Firm—Kalish & Gilster

[57] ABSTRACT

A spinning reel having a bail rotor rotably mounted on a reel body, a spool pin rotatably, and axially slidably, mounted on the reel body, a spool carried on the spool pin for rotation therewith and having adopted for windingly receiving thereabout a fishing line, a drag, mechanism mounted on said reel body, is operatively interconnected with said spool pin for permitting application of a drag force to the spool. The spinning reel also comprehends a measuring operation member adapted for rotating the spool, a measuring spring member connecting the measuring operation member and the spool whereby upon rotation of the measuring operation member the spring is stressed to establish a torque corresponding to the drag force set by the drag mechanism. A scalar indicator device is provided for indicating in terms of the set drag force the amount of relative rotation between the operation member and the spool before the same and jointly rotated.

13 Claims, 21 Drawing Figures

DRAG FORCE MEASURING DEVICE FOR SPINNING REELS

BACKGROUND OF THE INVENTION

The present invention relates, in general, to drag force measuring devices and, more particularly, to a drag force measuring device for a spinning reel, capable of measuring and confirming the actual drag force of the spinning reel and of effecting the setting of a proper drag force for the particular fishing line used.

The spinning reel is generally equipped with a drag mechanism for preventing the fishing line from being cut by an intense tug acting on the line, an abrupt turn of the line, etc., as is disclosed in Japanese Utility Model Laid-Open No. 48-50592.

The drag mechanism of this type is generally constructed for coupling to a spool pin so that the torque of the spool in a line-releasing direction, i.e., the drag force (against the tugging force of the line) may be adjusted in accordance with the strength of the line wound on the spool, by turning a knob forwardly and backwardly to adjust the fastening force on a group of drag washers.

In the aforementioned drag mechanism for a spinning reel according to the prior art, the drag force adjusting knob is formed with an indicator portion and the spool or reel body is provided with an indicator scale so that the drag force is indicated by the indicator portion of the adjusting knob pointing to aforesaid scale. Such merely indicates the thrust force of a spring member upon the grouped drag washers to the extent of revolution of the knob but not the actual drag force so that it indicates all but a criterion of the drag force. As a result, it is impossible to know the strength to which the drag force is actually set. Especially, when the drag washers have worn or when the force of the spring member is reduced due to fatigue or the like, the relation between the numerical value of the scale indicated by the knob and the drag force changes making it impossible to set a desired drag force accurately. Additionally, since the fisherman sets the drag force by sensing the pulling force of the fishing line wound on the spool when pulled, the setting of the drag force by a beginner and an expert can cause problems such as, for example, of having the line cut during fishing by applying an excessive drag force to the line.

SUMMARY OF THE INVENTION

The present invention has been conceived so as to solve the above-specified problems and an object thereof is to provide a drag force measuring device for a spinning reel, which can actually measure and confirm the adjusted drag force and can effect the setting a drag force suitable for the particular fishing line used.

Another object of the present invention resides in that the most appropriate drag force for the particular fishing conditions can be set reliably and easily.

A further object of the present invention permits the drag force suitable for the strength of the line used to be set so as to prevent the development of undesired difficulties such as the cutting of the line beforehand.

An additional object of the present invention permits the most appropriate drag force for the actual fighting with the fish (or releasing of the line) to be set by changing the adjustment of the drag force to a strong or weak level during the fighting, so that the subsequent operation can be made remarkably facile.

Another object of the present invention comprehends characteristics of the drag mechanism for confirming, by actual measurement, the drag force so that the wear (or durability) of the drag washers or the like can be easily reached for repair and inspection.

By turning a measuring operation member of the present invention, a torque consequent to the elastic deformation of a measuring spring member is established in a spool being braked by the drag mechanism. When the torque reaches the drag force set by the drag mechanism, the spool including the operation member is rotated against the drag force. Then, the set drag force can be actually measured by indicating in an indication portion the relative displacement between the operation member and the spool or a member made rotatable with the latter.

By turning a measuring operation member in accordance with other operations of the present invention, a torque consequent to the elastic deformation of a measuring spring member is established in a spool being braked by the drag mechanism. When the torque reaches the drag force set by the drag mechanism, the spool including the operation member is rotated against the drag force. Then, the set drag force can be actually determined by scalar indication in an indication portion and the relative displacement between the operation member and the spool.

BRIEF DESCRIPTION OF THE DRAWINGS

FIG. 1 is a partially cut-away side elevational view.

FIG. 2 is an end view taken on the line II—II of FIG. 1.

FIG. 3 is an exploded perspective view showing a portion of the measuring mechanism.

FIG. 6 is a partial longitudinal sectional view.

FIG. 7 is a transverse sectional view taken on the line VII—VII of FIG. 6.

FIG. 8 is a side elevational view.

FIG. 9 is a longitudinal sectional view of the device illustrated in FIG. 8.

FIG. 10 is a partially cut-away side elevational view.

FIG. 11 is an end view taken on the line XI—XI of FIG. 10.

FIG. 12 is a side elevational view.

FIG. 13 is a transverse sectional view taken on the line XIII—XIII of FIG. 12.

FIG. 14 is a view taken on the line XIV—XIV of FIG. 12.

FIG. 15 is a side elevational view.

FIG. 16 is a sectional view taken on the line XVI—XVI of FIG. 15.

FIG. 17 is a front elevational view of a drag force measuring mechanism corresponding to the view of the embodiment shown in FIG. 2.

FIG. 18 is a perspective view of the measuring spring.

FIG. 19 is a side elevational view, in partial section, of the measuring device.

FIG. 20 is an end elevational view taken on the line XX—XX of FIG. 19.

DESCRIPTION OF THE PREFERRED EMBODIMENTS

Figure 1:
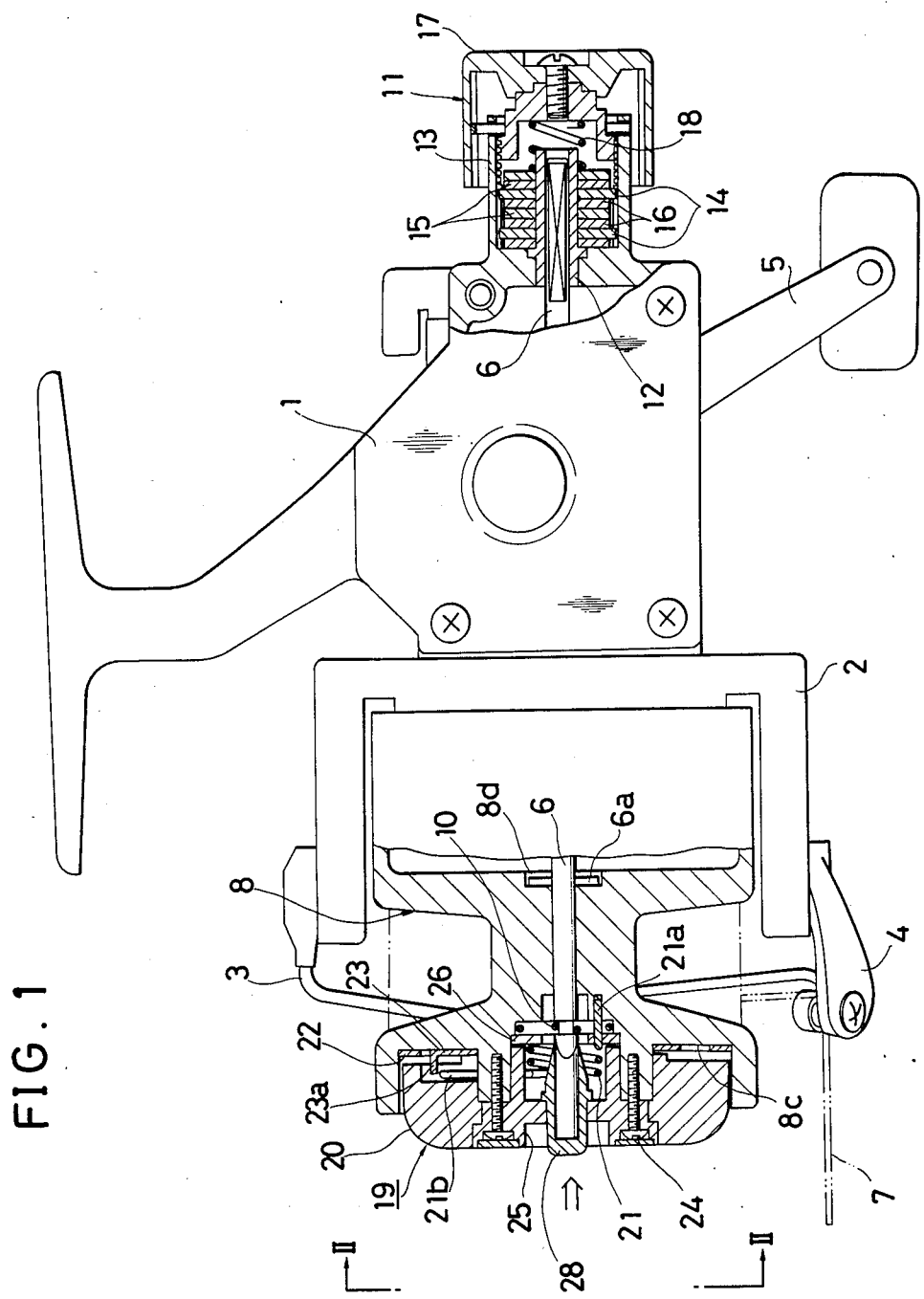
FIGS. 1 to 3 illustrate a first embodiment of the drag force measuring device for a spinning reel constructed in accordance with and embodying the present invention.
Figure 2:
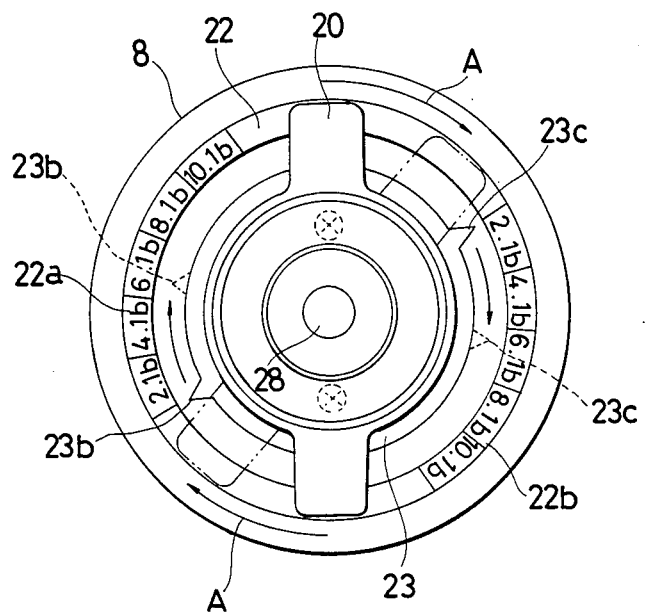
Figure 3:
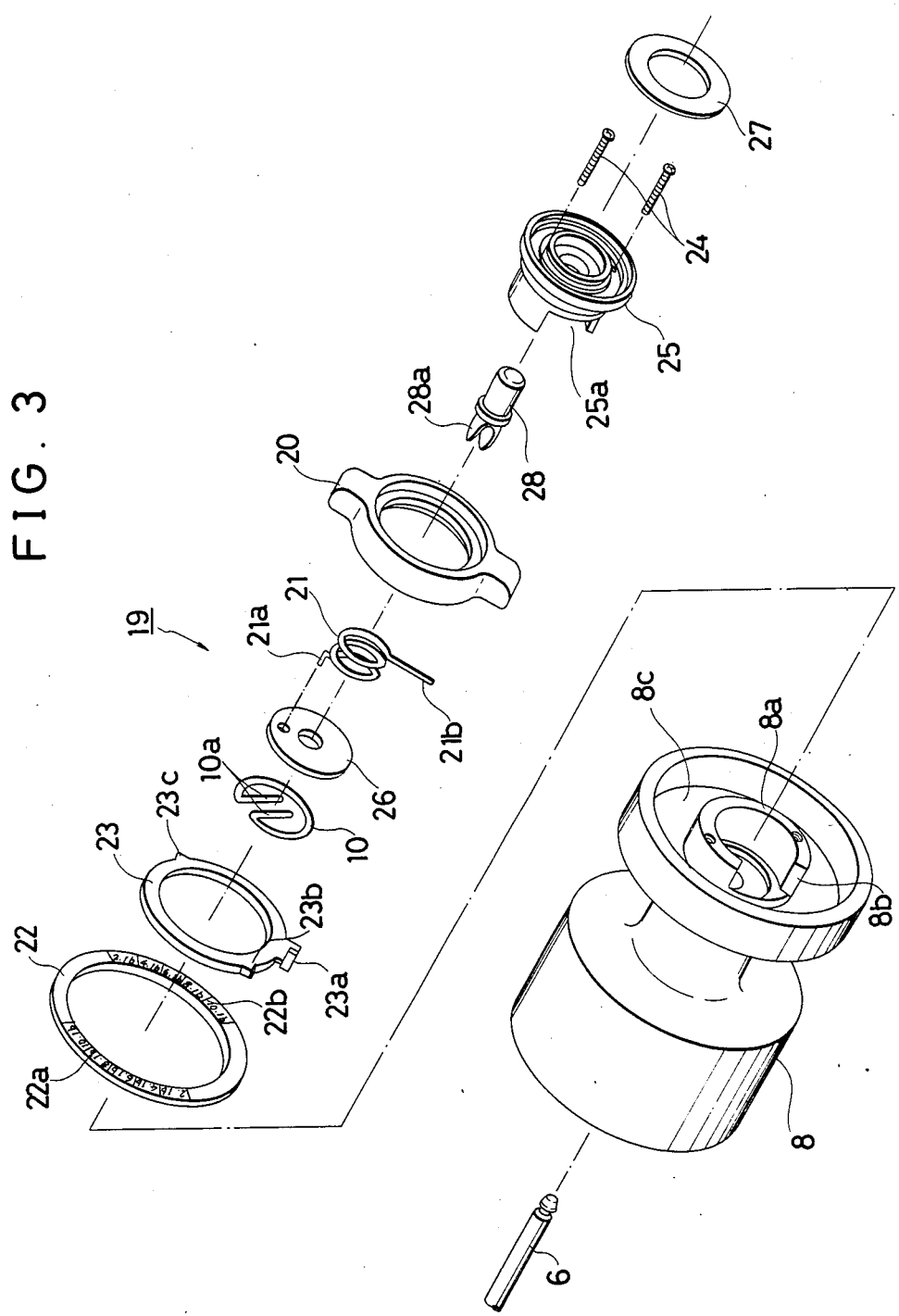

FIGS. 1 to 3 illustrate the first embodiment of the drag force measuring device for a spinning reel according to the present invention.

Therein 1 indicates a reel body; 2 indicates a rotor which is rotatably borne on reel body 1 by a bearing spindle (not-shown); 3 designates a bail which is attached to rotor 2 through an arm lever 4; and 5 indicates a handle attached to reel body 1. Handle 5 and the bearing spindle of rotor 2 are connected through a gear mechanism (not-shown) which is mounted in reel body 1 so that the rotor 2 and the bail 3 can be revolved in a line take-up direction by turning handle 5. Indicated at 6 is a spool pin which is supported on reel body 1 coaxially with the bearing spindle of rotor 2 such that it can revolve and also reciprocate in axial directions. A radial projection 6a of spool pin 6 at the side of rotor 2 is fittedly received within a recess 8d of spool 8 upon which fishing line 7 may be wound. On the leading end of spool pin 6, projecting into a cylindrical portion 8a (FIG. 3), which is concentrically formed at the forward end face of spool 8, there is retained a snap ring 10 having pin retaining portion 10a attaching and detaching spool 8 whereby said spool 8 can be removed from spool pin 6 by withdrawal of said snap ring 10. Such makes it possible to interchange the fishing line suitable for target fish by exchanging spool 8, if necessary.

Indicated at 11 is a drag mechanism which is attached to the rear end of reel body 1, and comprises: a drag shaft 12 which is rotatably borne by reel body 1 and in which the rear end portion of spool pin 6 is fitted immovably relative thereto but slidably in axial directions; a first set of drag washers 14 which are mounted on drag shaft 12 for rotation relative thereto and fixedly engaged with a cylindrical portion 13 formed on reel body 1; a second set of drag washers 15 which are disposed about shaft 12 but being non-rotationally relative thereto while being free of cylindrical portion 13; a plurality of lining washers 16 which are sandwiched between adjacent drag washers 14 and 15 (FIG. 1); a drag force adjusting knob 17 which is screwed on or otherwise engaged on cylindrical portion 13; and a drag force adjusting coil spring 18 which is interposed between knob 17 and the laminated assembly of drag washers 14, 15 and 16. As a result, the drag force upon spool 8 can be adjusted by manipulating drag force adjusting knob 17 for affecting spring 18 to alter the thrust force upon the assembly of washers.

Indicated at 19 (FIG. 3) is a drag force measuring mechanism which is assembled with spool 8 and is equipped with: an operation drum 20 for measuring the drag force; a measuring torsion spring 21 for establishing in drum 20 and spool 8 a torque corresponding to the drag force set by the drag mechanism 11; an annular indicator scale 22 for indicating the actually measured value of the drag force set by the drag mechanism 11; and an indicating member 23 which is integrally rotatable with drum 20.

Drum 20 is rotatably received in cylindrical portion 8a which concentrically projects from the central portion of the forward face of spool 8, and is rotatably held by a knob holding member 25 which is fixed to the cylindrical portion 8a by means of screws 24. Measuring torsion spring 21 is disposed within cylindrical portion 8a with one end 21a thereof extending through a washer 26 received in cylindrical portion 8a and retained near the center of spool 8. The other end portion 21b of spring 21 is retained in drum 20 (FIG. 1) through both a cut-away portion 25a formed in knob holding member 25 and a cut-away portion 8b formed in cylindrical portion 8a (See FIG. 3). Moreover, indicator scale member 22 is fixed on the base of a recess 8c defining the forward face of spool 8 and surrounding cylindrical portion 8a and is provided with, on opposed portions of the forward surface thereof, scales 22a and 22b for indicating set drag forces. Scales 22a and 22b indicate the strength of the fishing line used, as in pounds or the like. Indicating member 23 is rotatably mounted in recess 8c of spool 8 in concentric arrangement with indicating scale member 22 (FIG. 1). Indicating member 23 is provided with a projection 23a for engagement with operation drum 20, and with circumferentially spaced indicating portions 23b and 23c for respective cooperation with scales 22a and 22b.

27 indicates a name plate which is fixed on the forward face of the drum holding member 25. Indicated at 28 is a spool removing push button which extends through the central portion of knob holding member 25 for axially slideable movement and which is bifurcated at the inner end 28a (FIG. 1) portion thereof confronting the proximate leading end of spool pin 6 (FIG. 1). When push button 28 is pushed in the direction indicated by arrow in FIG. 1, the bifurcated end portion 28a' expands spool pin retaining portions 10a of snap ring 10 to disengage snap ring 10 from the spool pin 6 so that spool 8 may be separated therefrom.

The drag force measuring operations of the present embodiment having the construction thus far described are explained as follows:

Firstly, adjusting knob 17 of drag mechanism 11 is turned in accordance with the strength of the particular fishing line 7 wound on spool 8 so that a desired drag force is causing a thrusting force upon the assembly of washers 14, 15, and 16 through action of spring 18.

Next, measuring operation drum 20 is grasped and turned in the direction of arrow A as shown in FIG. 2. Spool 8 is not affected by such action, as only operation drum 20 and indicating member 23 are turned in the direction of arrow A, because the braking (or drag) force of drag mechanism 11 is applied to the spool 8 through spool pin 6. At this time, the drag force measuring torsion spring 21 is elastically deformed in the winding direction so that the torque of operation drum 20 increases. If the torque accompanying the elastic deformation of the torsion spring 21 slightly exceeds the drag force set by the drag mechanism 11, slippage will be caused between the respectively adjacent washers of the drag mechanism 11 so that spool 8 containing spool pin 6 is turned in its entirety integrally with operation drum 20 in the direction of arrow A. If scales 22a and 22b on member 22 pointed at this time by indicating portions 23b and 23c respectively of indicating member 23 are read out, the values indicate the actual drag force so that the actually measured value of the drag force can be confirmed.

If the spool 8 is turned integrally with the operation drum 20 in the direction of the arrow A when drum 20 is turned from the position shown in full lines in FIG. 2 to the position shown in phantom lines, for example, the scale of 6 lb (i.e., pounds) indicated by indicating portions 23b and 23c constitutes the actual drag force set by drag mechanism 11 so that the action of the tensile force of 6 pounds upon the line being released can be confirmed. By knowing the indicated value, therefore, it is possible to accurately know whether or not the drag force set is suitable for the fishing line 7 wound on spool 8. As a result, if the line used by the fisherman is one for 6 lb, it is easily recognized that the line has a strength allowing him to use it up to the indication of 6 lb. Thus, even a beginner fisherman can set an appropriate drag force, being thereby freed from the difficulties consequent to line cutting from an improper drag force setting. At the same time, the beginner can accurately set the drag force independently of the scaling of adjusting knob 17 even if the washers 14, 15, and/or 16 are worn.

If adjusting knob 17 of the drag mechanism 11 is operated while measuring drum 20 is in its measuring state, the drag force can be adjusted to a level suitable for the fishing line 7 being used. Operation drum 20 is caused to be restored to its initial position by action of torsion spring 21 when drum 20 is released from the finger control.

Figure 4:
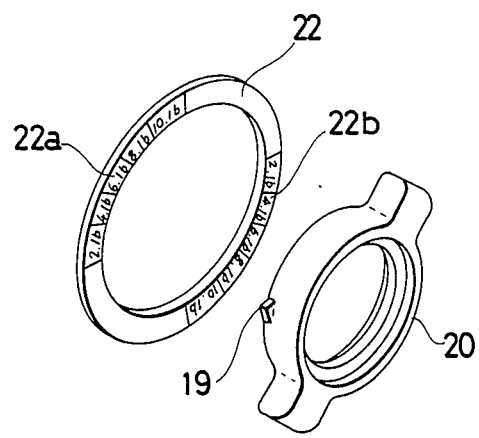
FIGS. 4 and 5 are exploded, perspective views illustrating other modifications of the drag force indicating device constructed in accordance with and embodying the present invention.

FIG. 4 shows a modification of the drag force indicating device according to the present invention wherein measuring operation drum 20 is provided on the outer circumference thereof with an indicating portion 29 for pointing to scales 22a, 22b of indicating scale member 22, thereby permitting omission of indicating member 23.

Figure 5:
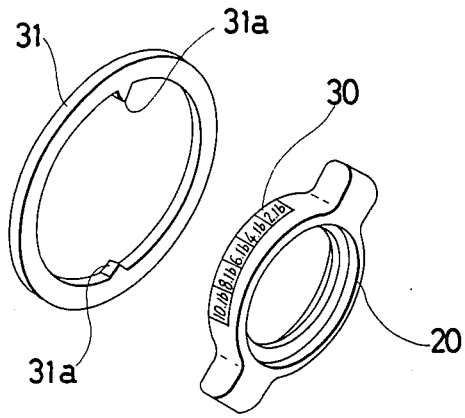

FIG. 5 illustrates still another modification of the drag force indicating device of the present invention. Measuring operation drum 20 is provided on the outer periphery thereof with a drag force indicating scale 30 for cooperation with a ring-forming member 31 (which corresponds to indicating scale member 22 shown in FIG. 3) disposed within recess 8c of the spool 8 surroundingly of drum whereby opposed indicating or pointer portions 31a projecting inwardly from the inner face thereof coordinate with scale 30. This particular modification can thus be utilized in lieu of the modification shown in FIG. 4. The front face of recess 8c of spool 8 is formed by the separate member with the indicating scale and the indicating portions.

However, separate member may be dispensed with by forming the indicating scale and the indicating portions directly on the base of recess 8c of spool by a printing or molding (such as engraving) process. Thus, the particular indicating means may be the subject of various expedients and should not be considered as limited to those enumerated herein.

Figure 6:
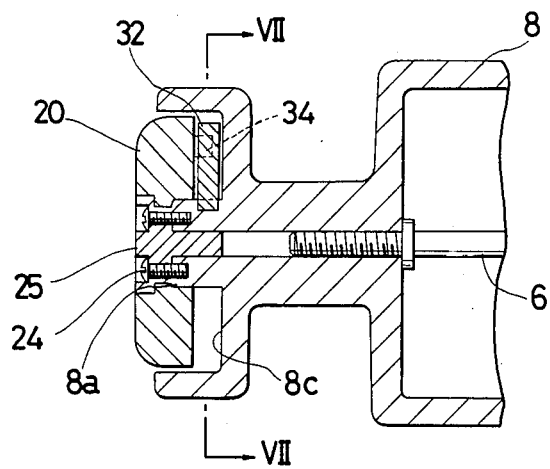
FIGS. 6 and 7 illustrate a second embodiment of the drag force measuring device for a spinning reel constructed in accordance with and embodying the present invention.
Figure 7:
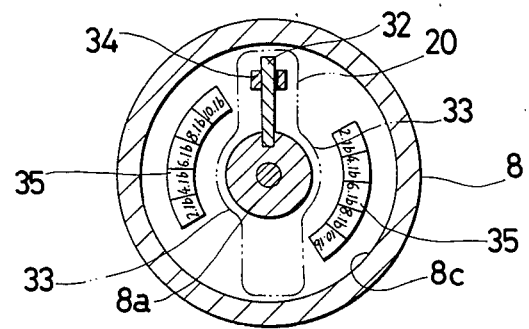

FIGS. 6 and 7 show a second embodiment of the drag force measuring device of the present invention, wherein measuring operation drum 20 is rotatably fitted on cylindrical portion 8a of spool 8 by means of holding member 25 and screws 24 and with there being a radially extending drag force measuring leaf spring 32 with one end thereof being fixed to the outer circumference of cylindrical portion 8a and the other end thereof retained by a projection 34 designed to project from the back or inner face of operation drum 20. An indicating portion 33 is provided on the outer circumferential face of operation drum 20 with a drag force indicating scale 35 being formed on the base or forward face of recess 8c of spool 8 in a manner to coordinate with indicating portion 33 as shown in FIG. 7.

By this second embodiment, the measuring mechanism can be substantially simplified, while operating equally efficiently as the foregoing first embodiment.

Figure 8:
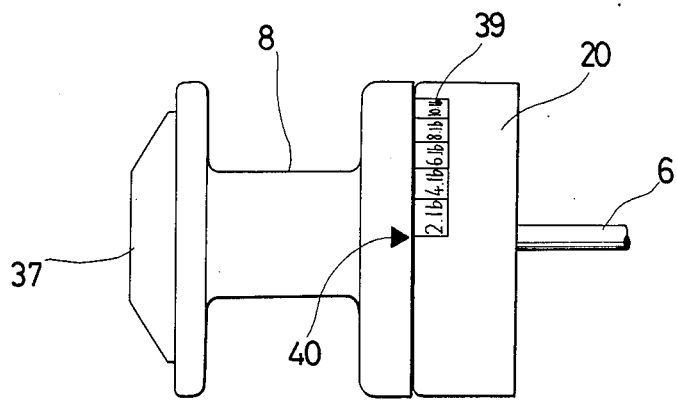
FIGS. 8 and 9 illustrate a third embodiment of the drag force measuring device for a spinning reel constructed in accordance with and embodying the present invention.
Figure 9:
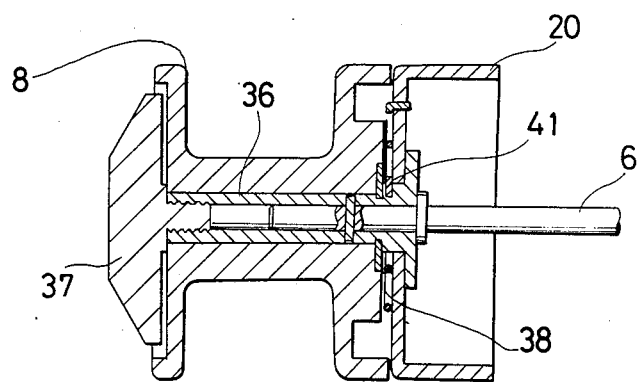

FIGS. 8 and 9 show a third embodiment of the present invention, in which a metal spindle 36 is coaxially fixed on the leading end of spool pin 6; spool 8 being non-rotatively fixed on said spindle 36 and knob 37 is screwed into spindle 36 which projects through an opening in the base recess 8c of spool 8 thereby preventing said spool from coming out. Measuring operation drum 20 is rotatably mounted on the opposite rearward end portion of said spindle 36 which is joined to spool pin 6 by means of a holding member 41; and a helical measuring spring 38 is concentrically arranged between the opposed or confronting faces of measuring operation drum 20 and spool 8 such that one end thereof is retained by spindle 36 and the other end is retained by measuring operation drum 20. Measuring operation drum 20 is formed on the outer circumferential face thereof with a drag force indicating scale 39 and an indicating mark 40 is suitably provided on the outer circumferential face of spool 8 facing operation drum 20.

In addition to obtaining operational results similar to those obtained by the first embodiment shown in FIGS. 1 to 3, the measuring mechanism of the embodiment can be made more simply. Since measuring operation drum 20 is arranged at the rearward portion of spool 8, there can be attained another effect in that the drag force can be easily measured without difficulty while drum 20 is being held in the palm of the hand and the reel is being gripped.

Although quite expectedly, the indicating scale should not be limited to the indication for setting such a drag force as is most suitable for the strength (in pounds, such as 2 lb or 4 lb) or the grade number (e.g., 2nd, 3rd, or 4th grade) of the fishing line used without any cut but may be made so absolute as to make the drag force (upon the line being pulled) directly visible.

As has been described hereinbefore, according to the present invention, the drag force measuring mechanism is assembled with spool 8 joined thereto, and the operation member of the measuring mechanism is operated to establish the torque corresponding to the set drag force in order to measure and indicate the drag force in terms of the torque. As a result, the drag force set by the drag mechanism can be actually measured and recognized, and the setting of the drag force suited for the fishing line used can be facilitated.

Figure 10:
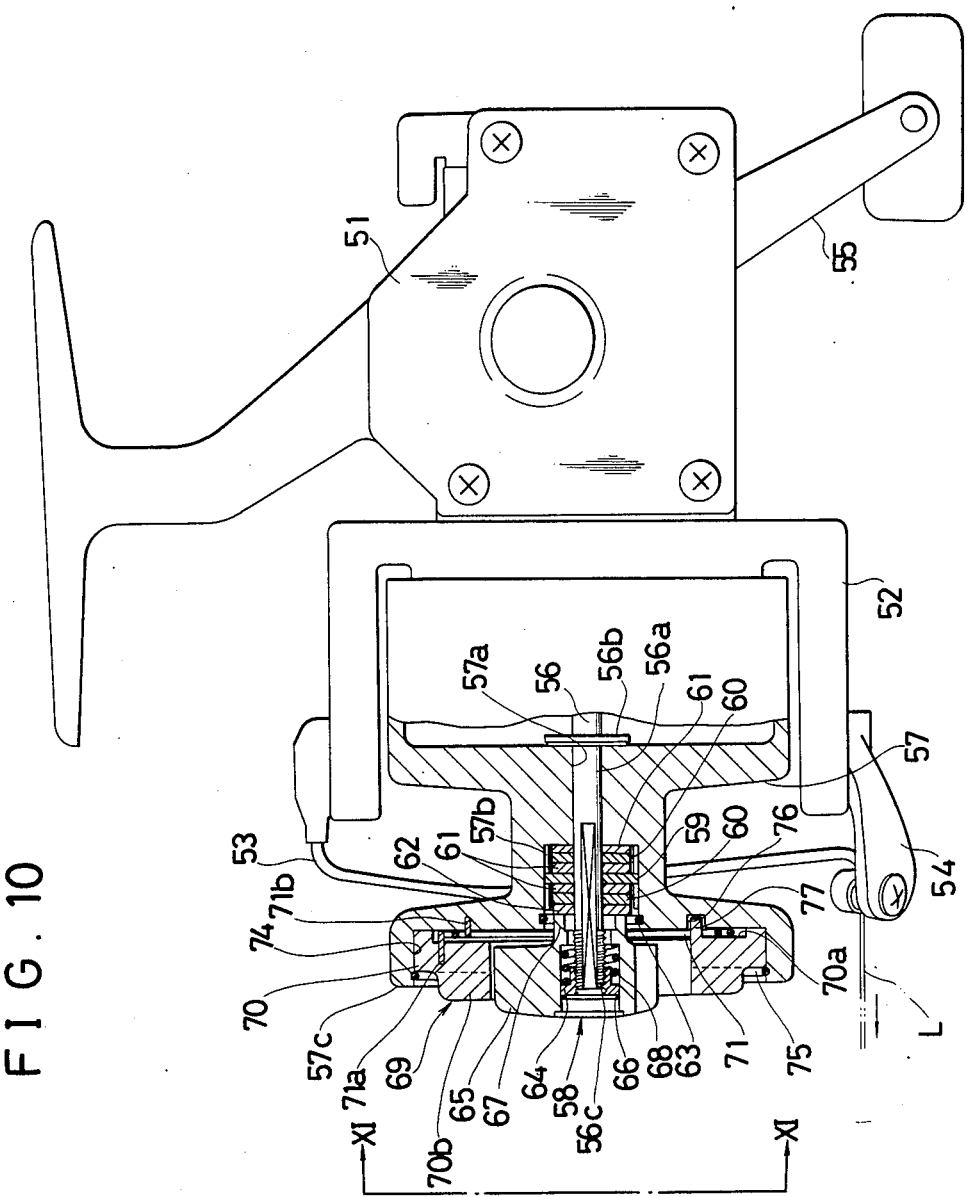
FIGS. 10 and 11 illustrate a fourth embodiment of the drag force measuring device for a spinning reel constructed in accordance with and embodying the present invention.
Figure 11:
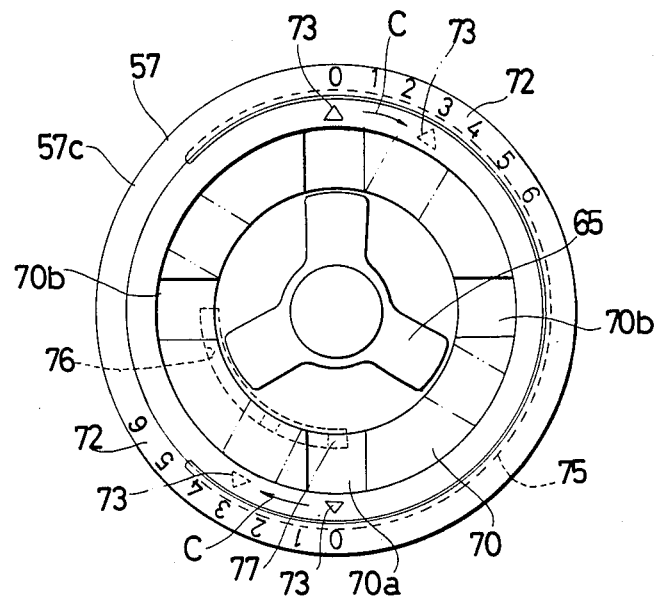

FIGS. 10 and 11 show a fourth embodiment of the drag force measuring device for a front drag type spinning reel, according to the present invention.

In these drawings: 51 indicates a reel body; 52 designates a rotor which is rotatably borne on the reel body 51 by a spindle (not shown); 53 indicates a bail which is attached to rotor 52 through an arm lever 54; and 55 designates a handle which is attached to reel body 51. Handle 55 and the bearing spindle of rotor 52 are connected through a gear mechanism (not shown) which is mounted in reel body 51 so that rotor 52 and bail 53 can be revolved in a line take-up direction by turning handle 55. Indicated at 56 is a spool pin which is supported on reel body 51 coaxially with the bearing spindle of rotor 52 so that it can revolve and axially reciprocate. On the stem 56a of spool pin 56 there is rotatably borne a spool 57 for winding a fishing line L; said projecting stem 56a being received within a central bore 57a of spool 57. Spool 57 has its movement toward rotor 52 regulated by the action of a receiving portion 56b fixed on projecting stem 56a. On the inserted portion of spool 57, there is disposed a drag mechanism 58 for applying the drag force thereof to spool 57.

Drag mechanism 58 is constructed of: a first drag washer 59 which is received in a cylindrical recess 57b formed in spool 57 concentrically with spool pin 56 so that it is non-rotational relative to spool 57 and is mounted on spool pin 56 for rotation relative thereto; a plurality of second drag washers 60 which sandwich the first drag washer 59 and are disposed on spool pin 56 for non-rotation relative thereto but in a state to be freed from spool 57; a plurality of lining washers 61 which are sandwiched between first drag washer 59 and each of the second drag washers 60; and between each of the second drag washers 60 and the base of the cylindrical recess 57b; and a receiving washer 62 laminated on the lining washer 61 at the open end portion of the front face of cylindrical recess 57b. Said washers are held in a laminated assembly by means of a snap ring 63 which engages the inner circumference of the open end of the cylindrical recess 57b for preventing displacement of the washer assembly from recess 57b. The project portion of spool pin 56 outwardly of cylindrical recess 57c is externally threaded at 56c, and a drag adjusting nut 64 is threadedly engaged thereon. A drag adjusting knob 65 is splined to the outer circumference of nut 64, which in turn is prevented by a snap ring 66 from displacement from knob 65. From knob 65 adjacent cylindrical recess 57b, there projects an integral cylindrical thrust portion 67 which abuts against receiving washer 62. A coil spring 68 for adjusting the drag force is mounted between the stepped portion of the thrust portion 67 and nut 64. As a result, if the drag adjusting knob 65 is turned forwardly or backwardly, the pressure of coil spring 68 to be applied to the washer assembly through thrust portion 67 is adjusted together with the drag force upon spool 57.

69 indicates a drag force measuring mechanism which is assembled in the forward portion of spool 57 and is equipped with: a measuring operation member 70 having an annular shape; a measuring torsion spring 71 for establishing in the measuring operation member 70 and the spool 57 a torque corresponding to the drag force set by the drag mechanism 58; indication scales 72 for indicating the actually measured value of the drag force set by the drag mechanism 58; and indicating portions 73 formed on the operation member 70.

Measuring operation member 70 is rotatably disposed in a circular recess 74 formed in the forward face of spool 57 concentrially with spool pin 56 and being held by a stop ring 75 elastically retained in the inner circumferential wall of circular recess 74. Circular recess 74 is formed in its base with an arcuate groove 76 concentric with spool pin 56 for regulating the range of the turning angle of measuring operation member 70. Extending into arcuate groove 76 is a projection 77 formed on the inner or confronting face of measuring operation member 70. Measuring torsion spring 71 is disposed within a recess 70a, formed in aforesaid inner face of measuring operation member 70, with the outer circumferential end 71a of spring 71 fixed to measuring operation member 70 and the inner circumferential end 71b thereof being secured to spool 57. Indication scales 72 are formed in two locations on the forward face of the edge portion 57c of spool 57 with a phase difference of 180 degrees in the circumferential direction; which scales are scaled as to the strength, e.g., the grade number, of the fishing line used. Indicating portions 73 for cooperation with scales 72 by pointing to the particular numeral thereon are suitably provided on the forward face of the outer circumferential edge of measuring operation member 70.

The drag force measuring operations of the present, fourth embodiment thus described, will be explained as follows:

First of all, adjusting knob 65 of the drag mechanism 58 is turned in accordance with the strength of the fishing line L wound on spool 57 so that a desired drag force is set by thrusting the washer laminated assembly through the thrusting portion 67 by action of spring 18.

Next, knob portion 70b formed on the forward face of measuring operation member 70 is engaged by the finger tips and turned in the direction of the arrow shown in full lines at C in FIG. 11. Thus, spool 57 is not rotated at the initial stage, but only operation member 70 is turned in the direction of the arrow C, because the braking (or drag) force set by drag mechanism 58 is applied to spool 57. Simultaneously torsion spring 71 is elastically deformed in the winding direction so that the torque of operation member 70 increases. If the torque accompanying the elastic deformation of torsion spring 71 slightly exceeds the drag force set by drag mechanism 58, slippage is caused between the first and second drag washers 59 and 60 through lining washers 61 so that spool 57 is turned in its entirety with operation member 70 in the direction of arrow C. If the indication scales 72 pointed by indicating portions 73 at this time are read out, the indicated values constitute the actual drag force whereby the measured value of the drag force can be confirmed.

If spool 57 is turned with operation member 70 in the direction of arrow C when operation member 70 is turned from the position shown in full lines in FIG. 11 to the position indicated by phantom lines, for example, the scale 3 (in the grade number) pointed to by indicating portions 73 gives the actual drag force set by the drag mechanism 58 so that the action of the tensile force of the 3rd grade upon the line being let out can be confirmed. By knowing the indicated value, it is possible to accurately know whether or not the drag force set is suitable for the fishing line wound on spool 57. As a result, it is easily known that the line being used by the fisherman is of the 3rd grade. Thus, even a beginner fisherman can set a proper drag force and is entirely freed from difficulties arising from the line being cut due to an improper setting of the drag force. At the same time, the beginner can accurately set the drag force independently of the scaling of the adjusting knob 65 even if the washers of the drag mechanism 58 are worn.

If the adjusting knob 65 of the drag mechanism 58 is operated while measuring member 70 is in its measuring state, the drag force can be adjusted to a level suitable for the fishing line used. Operation member 70 is caused to be restored to its initial position by action of torsion spring 71 upon release from the fingers.

Figure 12:
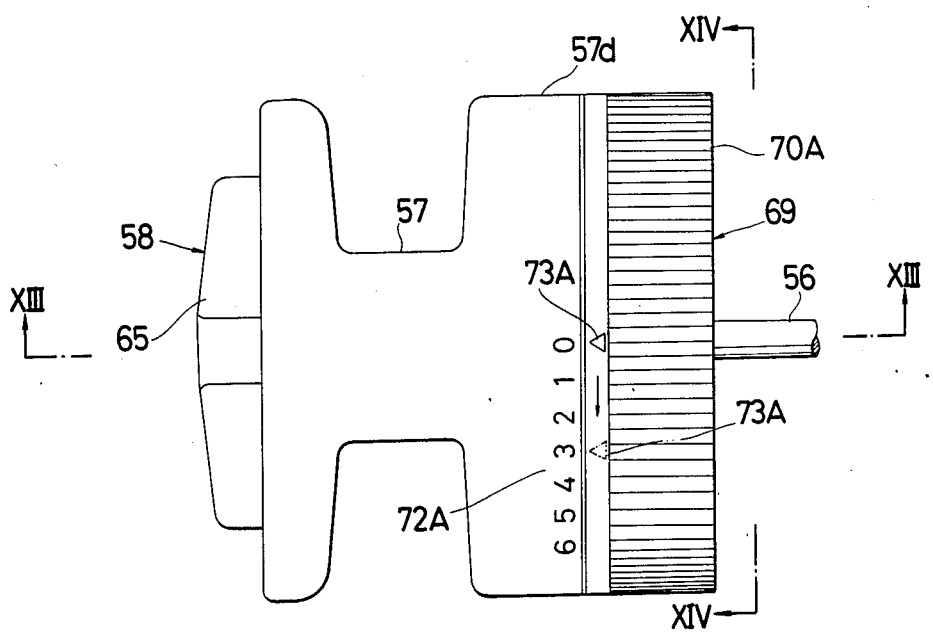
FIGS. 12 to 14 illustrate a fifth embodiment of the drag force measuring device for a spinning reel constructed in accordance with and embodying the present invention.
Figure 13:
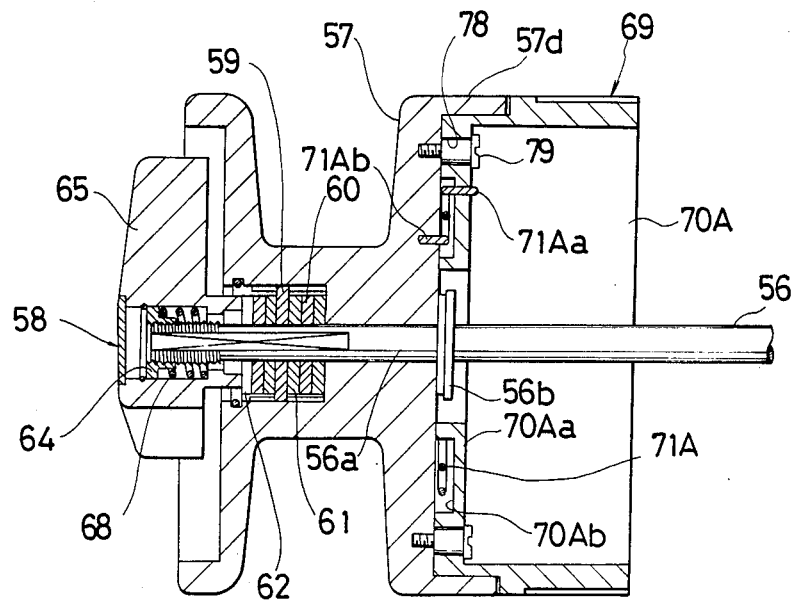
Figure 14:
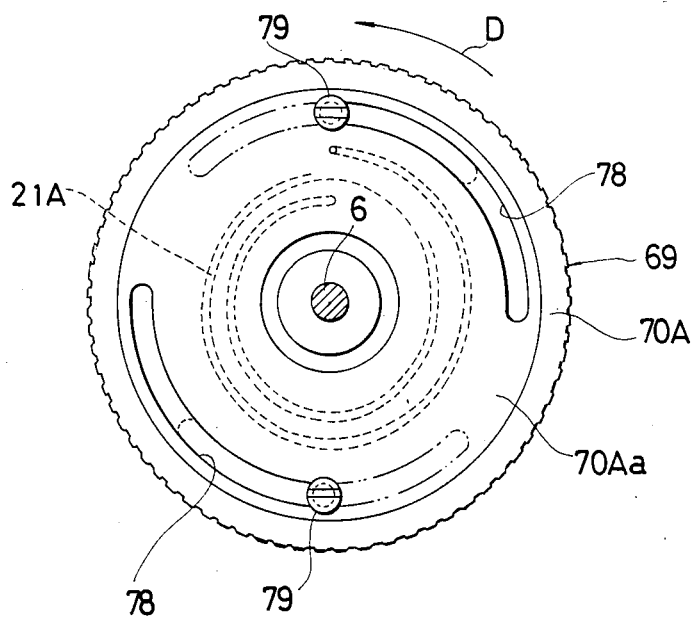

FIGS. 12 to 14, inclusive show a fifth embodiment of the drag force measuring mechanism according to the present invention, wherein the same reference numerals as appearing in FIGS. 10 and 11 indicate the same components or portions. Drag force measuring mechanism 69 in this embodiment is provided with a drum-shaped measuring operation member 70A having circular side wall and a base plate 70Aa which latter contains a central opening for extension therethrough of spool pin 56. Said operation member 70A is rotatable with respect to a skirt-forming portion 57d of spool 57 by means of screws 79 which extend through arcuate slots 78 formed in base plate 70Aa; which screws at the inner ends thereof are threaded into the confronting base or rearwardly directed face of skirt-forming portion 57d. A measuring torsion spring 71A is disposed within a circular recess 70Ab formed in base plate 70Aa with the outer circumferential end 71Aa thereof and the inner circumferential end 71Ab thereof suitably fixed in operation member 70A and spool 57, respectively. An indication scale 72A is provided, (as shown in FIG. 12) on the outer circumferential face of skirt 57d, with an indicating portion 73A being provided on the outer circumferential surface of measuring operation member 70A and located for coordination with indication scale 72A.

In the present embodiment, in case the drag force is to be measured, drum-shaped operation member 70A is turned in the direction of arrow D of FIG. 14 so that a torque may be established as a result of the deformation of the torsion spring 71A. When the torque developed by the elastic deformation of torsion spring 71A exceeds the drag force set by drag mechanism 58, spool 57 is turned with operation member 70A in the direction of arrow D. As a result, if the indication scale 72A pointed to by the indicating portion 73A at this time is read out, the actual drag force can be measured. According to the present embodiment, it is apparent that results similar to those of the above described fourth embodiment can also be obtained.

Figure 15:
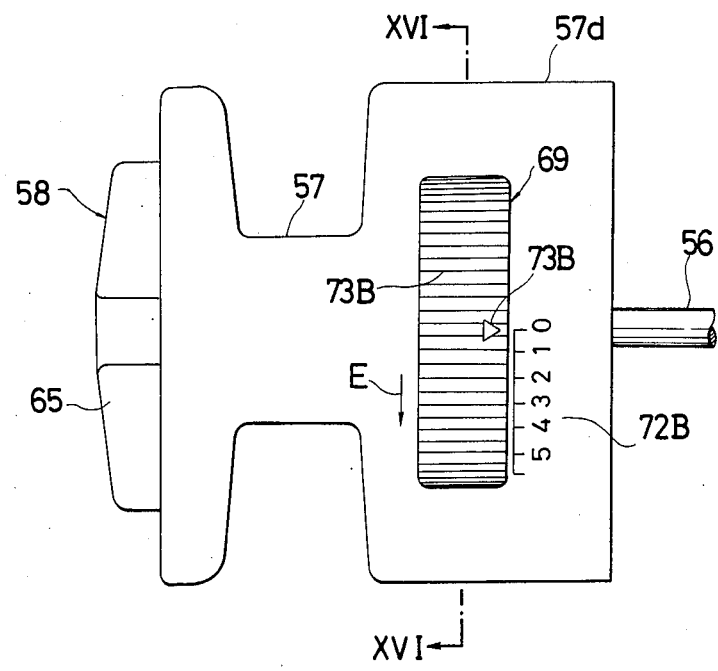
FIGS. 15 and 16 illustrate a sixth embodiment of the drag force measuring device for a spinning reel constructed in accordance with and embodying the present invention.
Figure 16:
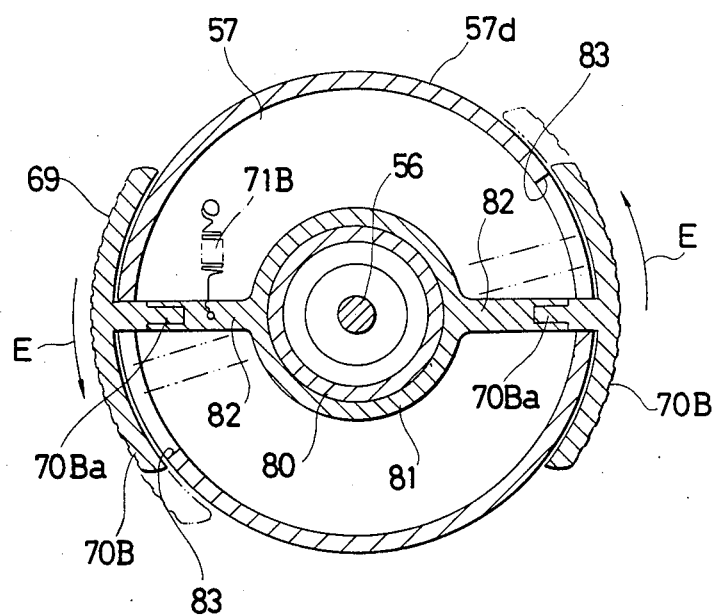

FIGS. 15 and 16 show a sixth embodiment of the drag measuring mechanism according to the present invention, wherein the same reference numerals as those appearing in FIGS. 10 and 11 indicate the same components or portions. The drag force measuring mechanism 69 of this embodiment is equipped with an annular boss 81 which is rotatably borne on a cylindrical spindle 80 formed integrally with, and projecting from the base or rearwardly directed face of skirt 57d of spool 57. Boss 81 is formed with a pair of outwardly extending arms 82, 82 which are arranged with a circumferential phase difference of 180 degrees. On the outer circumferential face of skirt 57d in facing or confronting relationship thereto are disposed arcuated measuring operation members 70B, 70B from the inner control portions of which project integrally formed connecting portions 70Ba, 70Ba, which latter extend through angle range regulating slots 83, 83 formed in the outer circumferential wall of skirt 57d. Inwardly of said last-mentioned wall connecting portions 70Ba, 70Ba are fixed to the proximate ends of the associated arms 82, 82. Between one arm 82 and spool 57 there is interposed a coil spring 71B for establishing a measuring torque. Measuring operation members 70B, 70B are each formed with an indicating portion 73B on the outer circumferential face thereof, while skirt 57d is provided on the outer circumferential face thereof with indication scales 72B located for coordination with the related indicating portion 73B.

When the drag force is to be measured, according to the sixth embodiment thus described, operation members 70B are turned in the direction of arrow E shown in FIG. 16 so that a torque may be established as a result of deformation of coil spring 71B. When the torque developed by the elastic deformation of coil spring 71B exceeds the drag force set by the drag mechanism 58, spool 57 is unitarily turned with opration members 70B in the direction of arrow E. As a result, if indication scales 72B pointed to by indicating portions 73B at this time are read out, the actual drag force can be measured.

Accordingly this embodiment provides results similar to those obtained by the above described fourth embodiment of the present invention.

In the foregoing fifth and sixth embodiments, incidentally, operation members are formed with the indicating portions whereas spool is formed with the indication scales, but, if desired, operation members may be formed with the indication scales and with the spool being formed with the indicating portions. Indicating scales should not be limited to the indication for setting such a drag force as the same are most suitable for indication of the grade number (e.g., 2nd, 3rd, or 4th grade) or the strength (in pounds such as 2 lb or 4 lb) of the fishing line used without danger of being cut; but may be made so absolute as to made the drag force (upon the line being pulled) directly visible.

Figure 17:
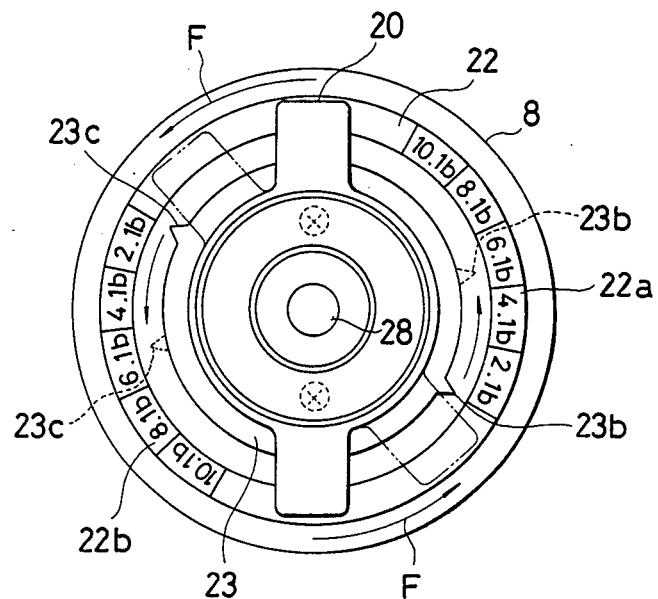
FIGS. 17 and 18 illustrate a seventh embodiment constructed in accordance with and embodying the present invention.
Figure 18:

FIGS. 17 and 18 show a seventh embodiment of the present invention, in which like reference numerals as those in FIG. 2 designate corresponding components or portions. The embodiment of FIGS. 17 and 18 has a construction similar to the embodiment shown in FIG. 2 and differs therefrom only in that the drag force of the drag mechanism 11 can be measured and indicated by rotation counterclockwise (in the direction of an arrow F), i.e. in the reverse direction to that in the embodiment shown in FIG. 2.

For this purpose, in this embodiment, measuring torsion spring 21A is connected at opposite ends thereof to spool 8 and operation drum 20; said spring 21A is composed of a sinistral coil spring which is coiled in a direction opposite to that of torsion spring 21 of FIG. 3.

In measuring and confirming the drag force regulated by the drag mechanism 11 in the drag force measuring device thus described, if operation drum 20 is rotated in the direction of an arrow F in FIG. 17, torsion spring 21A is resiliently deformed in the direction of coiling so as to increase the torque of the operation drum 20. As a result, when this torque becomes even a little bit greater than the drag force predetermined by the drag mechanism 11, slippage between washers of the drag mechanism causes the entire spool 8 including spool shaft 6 to be rotated, in the direction of the arrow F, together with operation drum 20 as a unit. For instance, if spool 8 is rotated with the drum 20 downwardly as operation drum 20 is rotated from the full line position shown in FIG. 17 to the phantom line position, a graduation or scale mark "6" lb (pound) pointed by pointers 23b, 23a indicates the actual drag force that is determined by adjusting the knob of the dragging mechanism 11. Accordingly, it is possible to precisely confirm whether this pointed value is the drag force suitable for the fishing line 7 wound around spool 8.

This embodiment not only offers the same result as the first embodiment, but is additionally advantageous in that the measuring device can be operated by the fisherman's left hand without burden to the hand.

Figure 19:
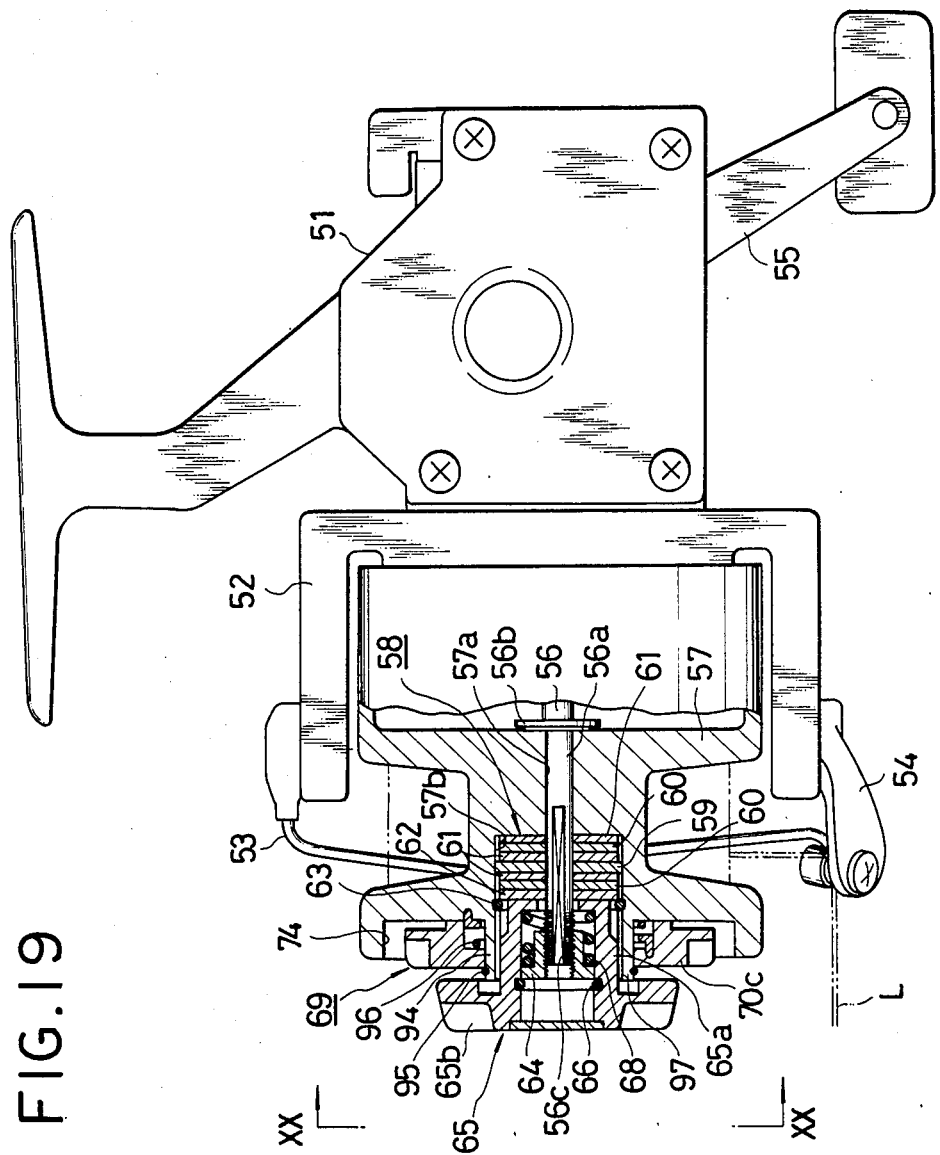
FIGS. 19 and 20 illustrate an eighth embodiment of the force measuring device constructed in accordance with and embodying the present invention.
Figure 20:
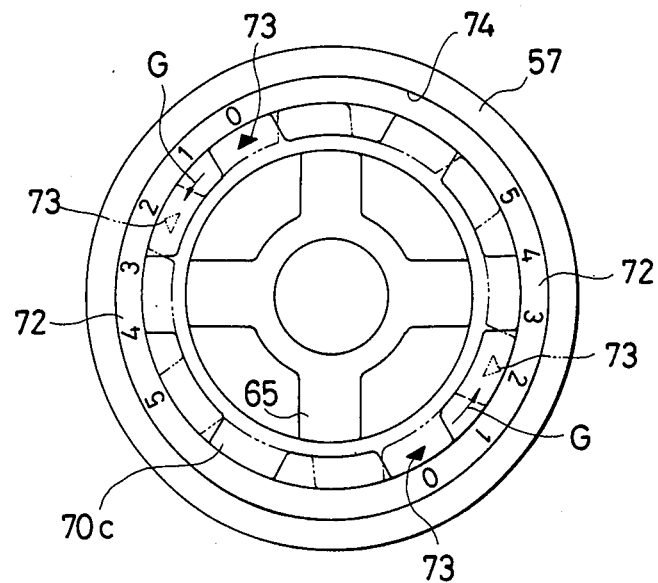

FIGS. 19 and 20 show an eighth embodiment of the present invention, in which like reference numerals as those in FIG. 10 designate corresponding components or portions. The embodiment shown in FIGS. 17 and 18 has a construction similar to the embodiment shown in FIG. 10 but differs therefrom in the following respect:

According to this embodiment, the drag force measuring operation can be effected by the fisherman's left hand without burden thereto, like the embodiment shown in FIG. 10, and the drag force adjusting operation can take place with ease, unlike the embodiment shown in FIG. 10. For this purpose, in this eighth embodiment, an outwardly projecting cylindrical boss 94 is formed at the center of a recess 27 in the front or forwardly directed surface of spool 57 concentrically thereof. A doughnut-shaped measuring operation member 70C is rotatably mounted on the periphery of boss 94 and is restrained by means of a snap ring 95 from inadvertant displacement from boss 94. Further, a sinistral torsion spring 96 is mounted concentrically around the periphery of boss 94 being disposed inwardly of measuring operation member 70C, and being connected at one end to spool 57 and at the other end to measuring operation member 70C.

Moreover, a drag force adjusting knob 67 of drag mechanism 58 includes a cylindrical tube 65a rotatably mounted in the cylindrical boss 94. The cylindrical tube 65a has, at one end inserted in boss 94, a pressure portion 67 disposed against a receptor washer 62 of a set of laminated washers. Cylindrical tube 65a has, at the other end projecting from boss 94, an integral grip 65b. Thus grip 65b projects outwardly from the surface of measuring operation member 70C so that the adjusting knob 65 can be gripped by the fingers, thereby facilitating the drag force adjusting operation. Like the embodiment shown in FIG. 10, a drag force adjusting nut 64 and a drag force adjusting compression spring 68 are mounted in cylindrical tube 65a of adjusting knob 65.

In measuring and confirming the drag force regulated by the drag mechanism 58 in the drag force measuring device thus described, if measuring operation member 70C is rotated counterclockwise, i.e. in the direction of in arrow G in FIG. 20, the sinistral torsion spring 96 is resiliently deformed in the direction of coiling so as to increase the torque of measuring operation member 70C. As a result, when this torque becomes even a little bit greater than the drag force determined by the drag mechanism 61, slippage occurs between the washers of the drag mechanism via a lining washer so that the entire spool 57 including the spool shaft 56 is rotated in the direction of the arrow B together with the measuring operation member as a unit. For instance, if rotation of spool 57 is initiated in the direction of the arrow G when measuring operation member 70C is rotated from the full line position to the phantom line position in FIG. 20, the value "2" of a graduation of scale mark 72 pointed by the pointer 73 indicates the actual drag force that is determined by adjusting the knob of the drag mechanism 61. Accordingly, it is possible to precisely confirm whether this pointed value "2" is the drag force suitable for the fishing line L wound around spool 57. Assuming that the value "2" is the drag force which is tolerable to a pulling force of 4 lb (pound), it is possible to confirm that the drag force is set to a value suitable to a fishing line L of 4 lb.

This embodiment not only offers the same result as the eighth embodiment above described (See FIGS. 19, 20), but it is additionally advantageous in that the drag force measuring mechanism can be operated by the fisherman's left hand without imposing burden on the hand. Further, because adjusting knob 65 of drag mechanism 58 projects outwardly from measuring operation member 70C, it is possible to adjust the drag force reliably with ease.

Although the sinistral torsion spring is used in the foregoing embodiments, it should of course noted that a dextral torsion spring may be used.

Figure 21:
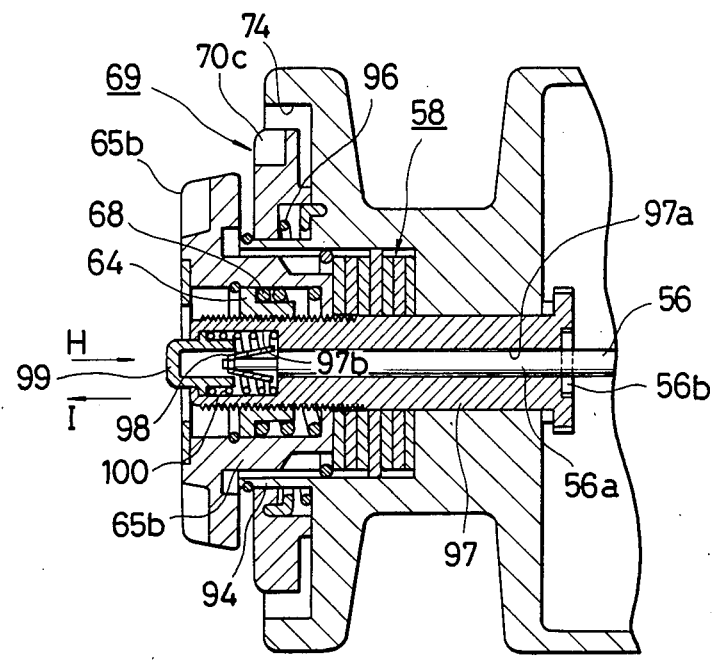
FIG. 21 is a fragmentary longitudinal-sectional view of a drag force measuring device constituting a ninth embodiment constructed in accordance with and embodying the present invention.

FIG. 21 shows a ninth embodiment of the present invention in which the drag measuring method corresponds to the fourth embodiment of the present invention hereinabove described.

In FIG. 21, like reference numerals as those in FIG. 19 designate corresponding components or portions. This embodiment of FIG. 21 has a construction similar to the embodiment shown in FIG. 19 and differs therefrom in that spool 57 including the drag mechanism 58 and the drag measuring mechanism 69 can be detachably mounted on spool shaft 56 in a simple manner.

For this purpose, a sleeve 97 is inserted through the axis of spool 57 and is fixedly secured thereto. A projected portion 56a of spool shaft 56 is detachably inserted in an axial opening 97a of sleeve 97. At the distal end of the projected shaft portion 56a a spring member 98 is mounted for preventing the sleeve 97 from inadvertent displacement. Further, a push button 99 is axially slidably received in a cylindrical opening 97b formed in the distal end of sleeve 97 for reducing the diameter of the spring member 98 to thereby allow spool 57 to be removed. Push button 99 is normally urged, by a coil spring 100 mounted in cylindrical opening 97b, to project outwardly from the cylindrical hole 97b.

Accordingly, for removing spool shaft 56 from spool 57, push button 99 is depressed in the direction of an arrow H in FIG. 21 against the bias of the spring 100 to thereby reduce the diameter of spring member 98 render same smaller than the diameter of axial opening 97a. In this state if spool 57 is pulled in the direction of an arrow I, the entire spool 57 including the sleeve 97 can be removed from the spool shaft 56.

As has been described hereinbefore, according to the present invention, the drag force measuring mechanism is assembled with the spool having the drag mechanism assembled therein, and the operation member of the measuring mechanism is operated to establish the torque corresponding to the particular drag force set in order to measure and indicate the drag force in terms of the torque. As a result, there can be attained the effects that the drag force set by the drag mechanism can be actually measured and recognized and that the setting of the drag force suitable for the fishing line used can be facilitated.

What is claimed is:

1. In a spinning reel having a bailed rotor rotably mounted on a reel body, a spool pin rotatably, and axially slidably, mounted on said reel body, a spool carried on said spool pin for rotation therewith and being adapted for windingly receiving thereabout a fishing line responsive to rotation of said spool, a drag mechanism mounted on said reel body, and means operatively interconnecting said drag mechanism and said spool pin for applying a drag force to said spool, the improvement comprising a drag force measuring device comprising a measuring operation member for rotating said spool, a measuring spring member connecting said operation member and said spool whereby upon rotation of said operation member said spring is stressed to establish a torque corresponding to the drag force set by said drag mechanism, and indicating means for indicating in terms of the applied drag force the amount of relative rotation between said operation member and said spool before the same are jointly rotatable.

2. The improvement defined in claim 1 wherein the indicating means comprises a indicator scale carried on said spool, and an indicating member movable with said operation member.

3. The improvement defined in claim 1 wherein the indicating means comprises an indicator scale provided on said measuring operation member, and an indicating member carried upon said spool surroundingly of said member.

4. The improvement defined in claim 1 wherein the measuring spring member is a torsion spring.

5. The improvement defined in claims 1 or 3 wherein the measuring spring member is leaf spring.

6. The improvement defined in claim 1 wherein the measuring spring member is a helical spring.

7. The improvement defined in claim 1 wherein said measuring operation member is mounted on said spool pin between said spool and the reel body.

8. The improvement defined in claim 7 wherein said measuring operation member is drum shaped, an indicator scale provided on the outer periphery of said drum, and an indicating member provided on said spool for cooperation with said indicator scale.

9. The improvement defined in claim 1 wherein said drag mechanism is interconnected with said spool pin in one end portion thereof, and said drag force measuring device engages the opposite end portion of said spool pin.

10. The improvement defined in claim 1 wherein the drag mechanism and the measuring operation member are disposed about the same end portion of said spool pin.

11. The improvement defined in claim 10 wherein an indicator scale is provided on the outer surface of said spool, and a cooperative scale pointing member is provided on the said outer surface of said operation member.

12. The improvememnt defined in claim 1 wherein the drag force measuring mechanism comprises an annular boss, a spindle engaged to said spool, said boss being rotably mounted on said spindle, said boss having a pair of outwardly extending arms having a circumferential phase difference of 180 degrees, said spool having opposite slots through which said arms project to permit relative movement therebetween and cooperative indicator means carried on the outer projecting ends of said arms and the adjacent portions of said spool.

13. The improvement defined in claim 1 wherein manually operable means are provided for effecting disengagement between said drag measuring member and said spool.

* * * * *